(12) United States Patent
Ko

(10) Patent No.: US 6,376,840 B1
(45) Date of Patent: Apr. 23, 2002

(54) SELECTABLE LENS ARRAY

(75) Inventor: Wai Shing Ko, Chapel Hill, NC (US)

(73) Assignee: Regent Lighting Corporation, Burlington, NC (US)

( * ) Notice: Subject to any disclaimer, the term of this patent is extended or adjusted under 35 U.S.C. 154(b) by 0 days.

(21) Appl. No.: 09/395,451

(22) Filed: Sep. 14, 1999

(51) Int. Cl.[7] .............................................. G01J 5/08
(52) U.S. Cl. .................................. 250/353; 250/DIG. 1
(58) Field of Search ............................. 250/353, 342, 250/349, DIG. 1, 222.1; 379/40; 346/506, 567

(56) References Cited

U.S. PATENT DOCUMENTS

| | | | |
|---|---|---|---|
| 4,672,206 A | * 6/1987 | Suzuki et al. | 250/342 |
| 5,026,990 A | * 6/1991 | Marman et al. | 250/342 |
| 5,128,654 A | * 7/1992 | Griffin et al. | 340/567 |
| 5,317,620 A | * 5/1994 | Smith | 379/40 |
| 5,572,033 A | * 11/1996 | Grant | 250/353 |
| 5,973,594 A | * 10/1999 | Baldwin et al. | 340/506 |
| 6,037,594 A | * 3/2000 | Claytor et al. | 250/353 |

OTHER PUBLICATIONS

Howard et al. "Lens adjustment apparatus for use with lens array for fine adjustment of coverage pattern of a passive infrared sensor in detection system", Pub–No CA 2315846 A1, Feb. 11, 2001, Copyright 2001 Derwent Information LTD.*

* cited by examiner

*Primary Examiner*—Constantine Hannaher
*Assistant Examiner*—Otilia Gabor
(74) *Attorney, Agent, or Firm*—Niro, Scavone, Haller & Niro

(57) ABSTRACT

A lens array for directing infrared light or radiation to a passive infrared detector having at least two Fresnel lenses mounted on or incorporated into the lens array. Each of the lenses has a different infrared detection pattern and the lenses on the array are adapted to be selectively indexed so that the infrared detection pattern of the array is altered by the indexing. The indexing may be accomplished by rotating the lens array or by the linear movement of the lens array.

11 Claims, 3 Drawing Sheets

SELECTABLE LENS ARRAY

BACKGROUND OF INVENTION

The invention relates to a lens array that may be used in connection with a motion sensing light fixture. More specifically the present invention generally relates to a single lens array or optical component that uses a plurality of lenses each of which has a different infrared detection pattern that may be selectively actuated to vary the infrared detection zone of the light fixture.

SUMMARY OF INVENTION

One particular use for the present invention is in a lighting device, whether indoor or outdoor, that has been adapted to sense "motion" as a change in infrared. To do this, the lighting device typically will use a passive infrared detector ("PIR") that works in combination with an optical component or lens array having a Fresnel lens which has a optical or infrared detection pattern that directs infrared to the PIR. However, because the detection pattern is generally preset or predetermined at the time of manufacture, the infrared detection pattern is accordingly preset or predetermined as well. This, in turn, limits the locations in which the lighting device may be used since the preset infrared detection pattern will only have one optimal location at which the light fixture may be mounted on a support surface that enables maximum infrared detection to occur.

To compensate for the need to varying the location of the light fixture, attempts have been made in the past to provide a degree of adjustability to the PIR to account for the fixed infrared detection pattern of the lens. In one attempt, the PIR and accompanying Fresnel lens are attached to a knuckle which allows a user to direct the lens in a plurality of directions. This solution, however, has several disadvantages including the need to manufacture and include on the fixture a bulky and adjustable housing that holds the lens and that must also extend outwardly from the fixture. This not only increases the cost of manufacture, it also impairs the aesthetic appeal of the unit, among other things.

Another method used is to make the lens and PIR a separate unit from the light fixture and to connect the components by wiring. For the reasons stated above, the solution is undesirable as well.

The present invention solves the above stated problems. It does so by providing a light fixture that includes a lens array which is in communication with a PIR. The lens array includes an optical component which has a plurality of lenses each of which has a different infrared detection pattern. The lenses of the optical component are selectively actuated thus allowing the infrared detection pattern to be adjusted to accommodate the location at which the light fixture has been placed.

DESCRIPTION OF THE DRAWING

The novel features which are characteristic of the present invention are set forth in the appended claims. However, the invention's preferred embodiments, together with further objects and attendant advantages, will be best understood by reference to the following detailed description taken in connection with the accompanying drawings in which:

DESCRIPTION OF THE PREFERRED EMBODIMENT

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
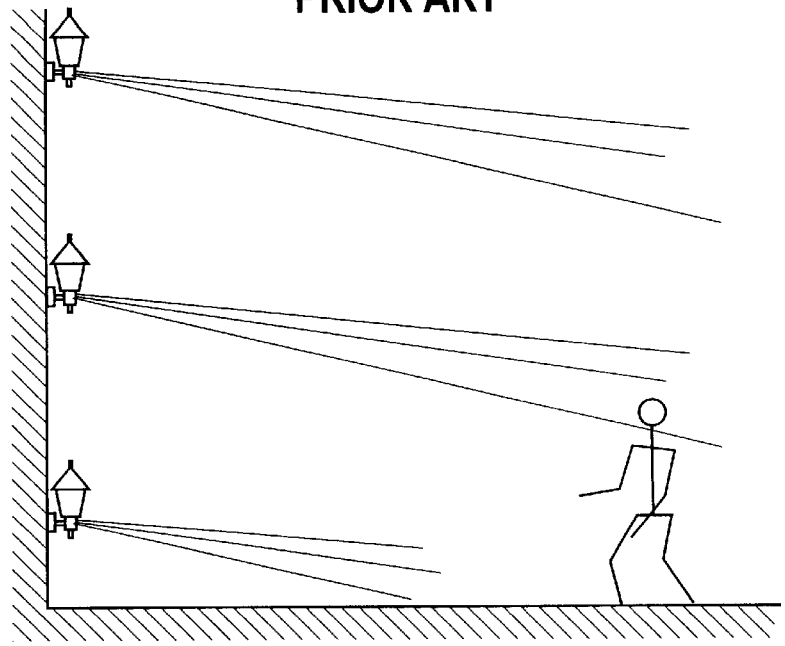
FIG. 1 shows how an optical component having a fixed detection pattern may diminish the fixture's ability to sense motion as a result of the mounting selected.
Figure 2:
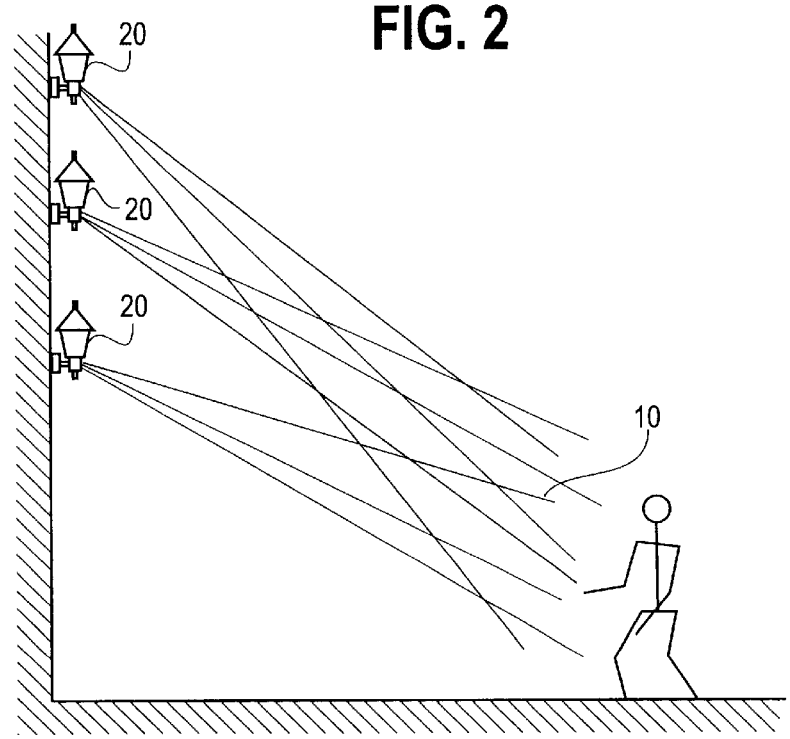
FIG. 2 shows how incorporating an optical component having a plurality of lenses having different infrared detection patterns may be used to accommodate different mounting locations.
Figure 3:
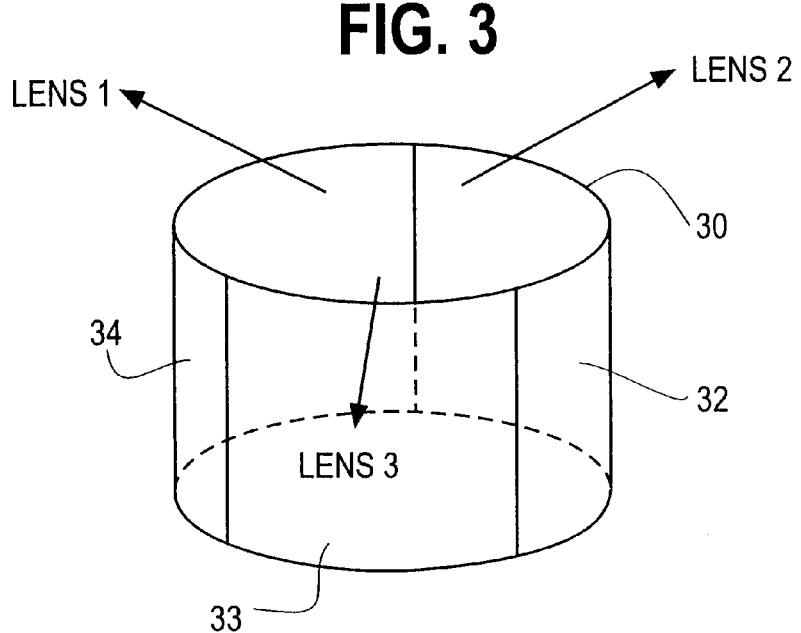
FIG. 3 shows one embodiment of an optical component having a plurality of lenses having different detection patterns arranged in a circular configuration.

FIG. 1 shows how employing a single optical component or lens having a fixed infrared detection pattern creates the potential that mounting the device in various positions will cause the fixed detection pattern to be outside the desired optimal area to be monitored. As shown, mounting the device too high or too low will result in a less than optional infrared detection zone. However, as shown in FIG. 2, using a lens array 30 with several lenses having different infrared detection patterns, which may be selectively actuated, allows the detection zone 10 to remain fixed or to be adjusted in order to accommodate the mounting location selected by the user.

Figure 5:
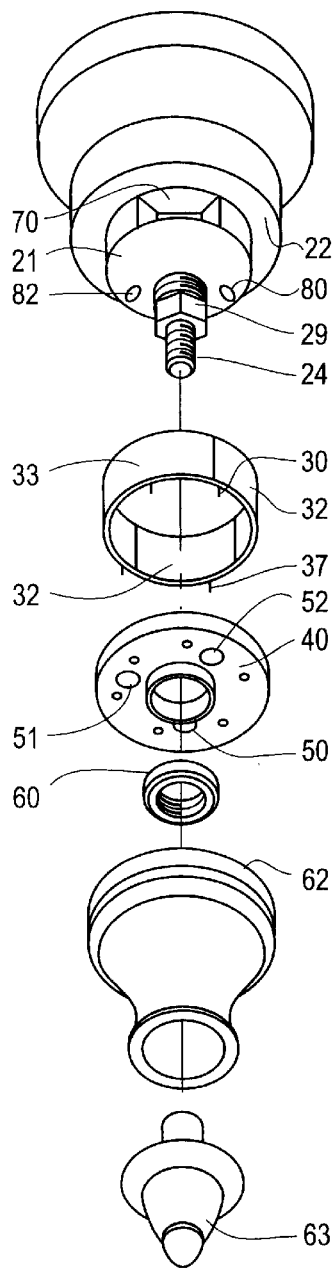
FIGS. 5 and 6 show exploded perspective views of one embodiment of the present invention in which the lens may be rotatably actuated.
Figure 6:
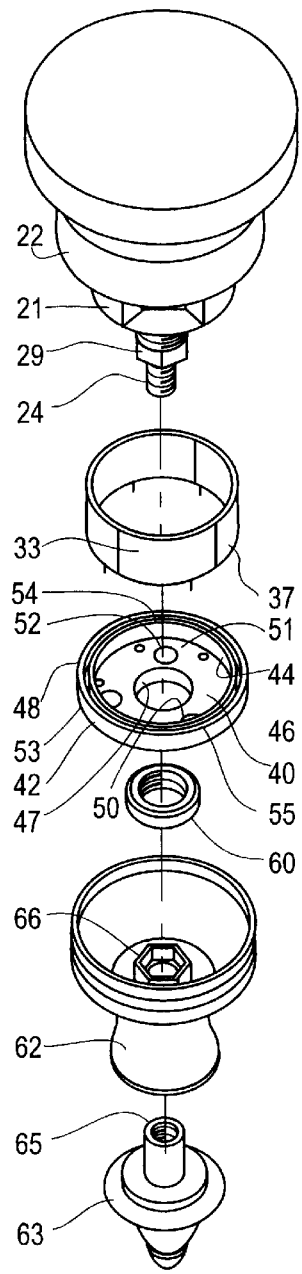
Figure 7:
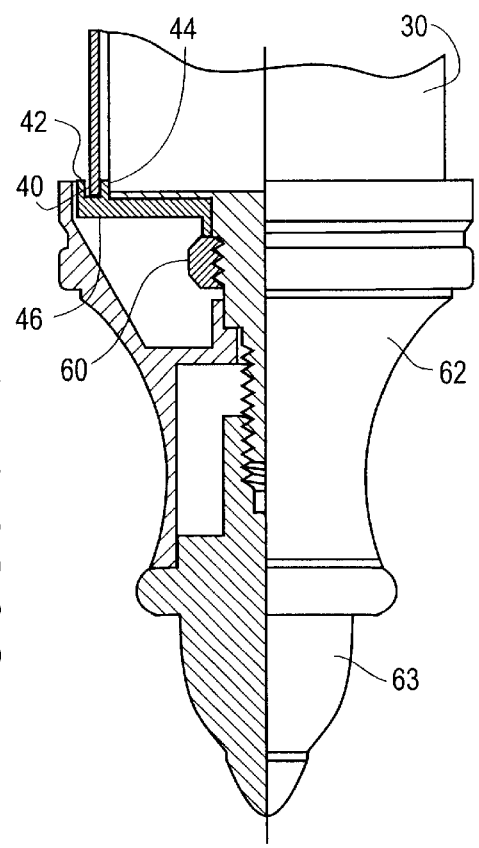
FIG. 7 shows a partial cross sectional view of the embodiment shown in FIGS. 5 and 6.

As shown in FIGS. 5 and 6, one embodiment of the present invention includes a PIR unit 22 the construction and operation of which is known to those of skill in the art. The PIR is adapted to convert the amount of infrared sensed into an electronic signal which is then used by the device's electronic's to sense motion. In the embodiment shown, PIR unit 22 includes a partially rotatable section 21 attached to a housing 20 and from which a mounting post 24 extends. Post 24 includes threads 27 and a hexagonal section 29.

As shown in FIGS. 3–6, also included is an optical component 30 having imbedded on it a plurality of lenses 32, 33 and 34 all of which have a different infrared detection pattern. While the component shown has a plurality of lenses formed on a single substrate, multiple substrates and multiple lenses may also be incorporated into a single optical component or lens array 30. Also included with lens array 30 are a plurality of posts 37. The lenses used may be a Fresnel lens the use and manufacture of which is know to those of skill in the art.

Also included is a base plate or rotator 40 having two opposingly located and extended walls 42 and 44 which form a channel 46 having a plurality of apertures 48 located in the bottom of the channel. Base 40 also has an aperture 47 through which post 24 extends. Lastly, base 40 further includes tabs 50, 51 and 52 having protruding projections 53–55.

The working components are covered by outer decorative housing 62, and decorative nut 63 having internal threads 65. Housing 62 also has a hexagonal shaped edge 66 which is adapted to receive hexagonal nut 29.

In use, PIR unit 22 may be located in housing 20 or affixed thereto. Optical component or lens array 30 circumscribes infrared detection opening 70 and directs infrared to the PIR through opening 70. To actuated optical component 30, it is affixed to a base or rotator 40 by having posts 37 extend through apertures 48. In addition, optical component 30 is securely retained by housing it within channel 46.

Optical component 30 and rotator 40 are secured to PIR unit 22 by inserting post 27 through aperture 47 and the components are held in place by affixing fastener 60 onto post 24. Housing 62 and nut 63 provide a decorative and protective cover and the coaction between hexagonal shape 29 and edge 66 allows opening 70 to be rotated by rotating cover 63.

Lens array or optical component 30 is rotatable about post 24 by turning component 30. Although component 30 may be actuated about post 24, tabs 50–52 and the respective projections 53–55 are spaced so as to coact with corresponding apertures 80 and 82. The spacing is such that the tabs urge the projections upwardly until there is coaction between two of the three projections with the apertures. The coaction results in and indicates that one of the plurality of lenses is properly aligned with opening 70. This allows the optical component or lens to be selectively actuated or indexed by a user to change the infrared detection pattern of the PIR to the optimal pattern for the mounting location selected.

Figure 4:
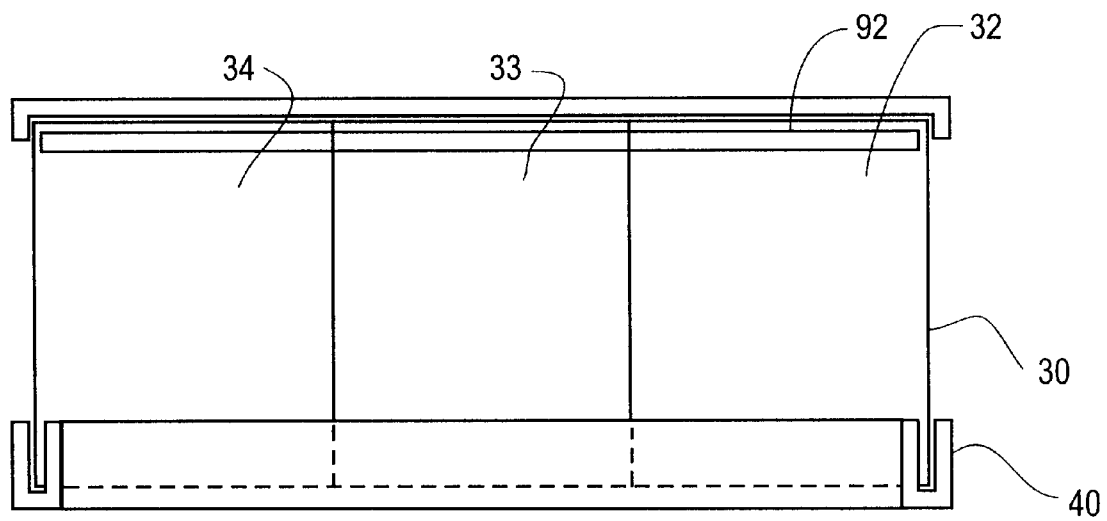
FIG. 4 shows a linear configuration of the lens array.

Another manner by which the detection pattern may be changed by selectively actuating or indexing the lenses of the optical component is shown in FIG. 4. In this embodiment, optical component 30 is located in opposing tracks 90 and 92. This arrangement also provides for selective linear indexing by allowing optical component 30 to slide within the tracks until the desired lens, with the proper detection pattern, is properly positioned.

While the invention has been described with reference to the preferred embodiments thereof, it will be appreciated that numerous variations, modifications, and alternate embodiments are possible, and accordingly, all such variations, modifications, and alternate embodiments are to be regarded as being within the spirit and scope of the invention.

What is claimed is:

1. A light activated by motion which is sensed as a change in infrared radiation detected comprising:
   a passive infrared radiation detector which is adapted to convert infrared radiation detected into an electronic signal which is used to detect motion as a change in infrared radiation;
   a lens array in communication with said detector, said lens array directs infrared radiation to said detector; and
   said lens array including at least two lenses, each of said lenses having a different detection pattern whereby said detection pattern may be altered by selectively actuating one of said lenses of said lens array.

2. The light of claim 1 wherein said lens array is comprised of separate Fresnel lenses, each of said Fresnel lenses having a different infrared detection pattern.

3. The light of claim 1 wherein said lens array includes a single substrate having at least two Fresnel lenses and in which each of said Fresnel lenses has a different infrared detection pattern.

4. A lens array for directing infrared radiation to a detector comprising:
   at least two Fresnel lenses mounted on said array;
   each of said lenses having a different infrared detection pattern; and
   said lens array adapted to selectively index said Fresnel lenses whereby said detection pattern of said lens array is altered by the indexing.

5. The lens array of claim 4 wherein said indexing is performed by the linear movement of said lense array.

6. The lens array of claim 4 wherein said indexing is performed by the rotational movement of said lens array.

7. The lens array of claim 4 wherein said Fresnel lenses are constructed on separate substrates which form a single lens array.

8. The lens array of claim 4 wherein said Fresnel lenses are constructed on a single substrate which forms said array.

9. A light fixture for sensing motion comprising:
   a housing having a passive infrared detector and a lens array;
   said lens array including a plurality of lenses which have different infrared detection patterns and which direct infrared to said passive infrared detector; and
   said plurality of lenses selectively actuatable whereby the infrared detection pattern used is changed by the selective actuation.

10. The light of claim 9 wherein rotational movement is used to selectively actuate said lens array.

11. The light of claim 9 wherein linear movement is used to selectively actuate said lens array.

* * * * *